United States Patent Office 2,861,184
Patented Nov. 18, 1958

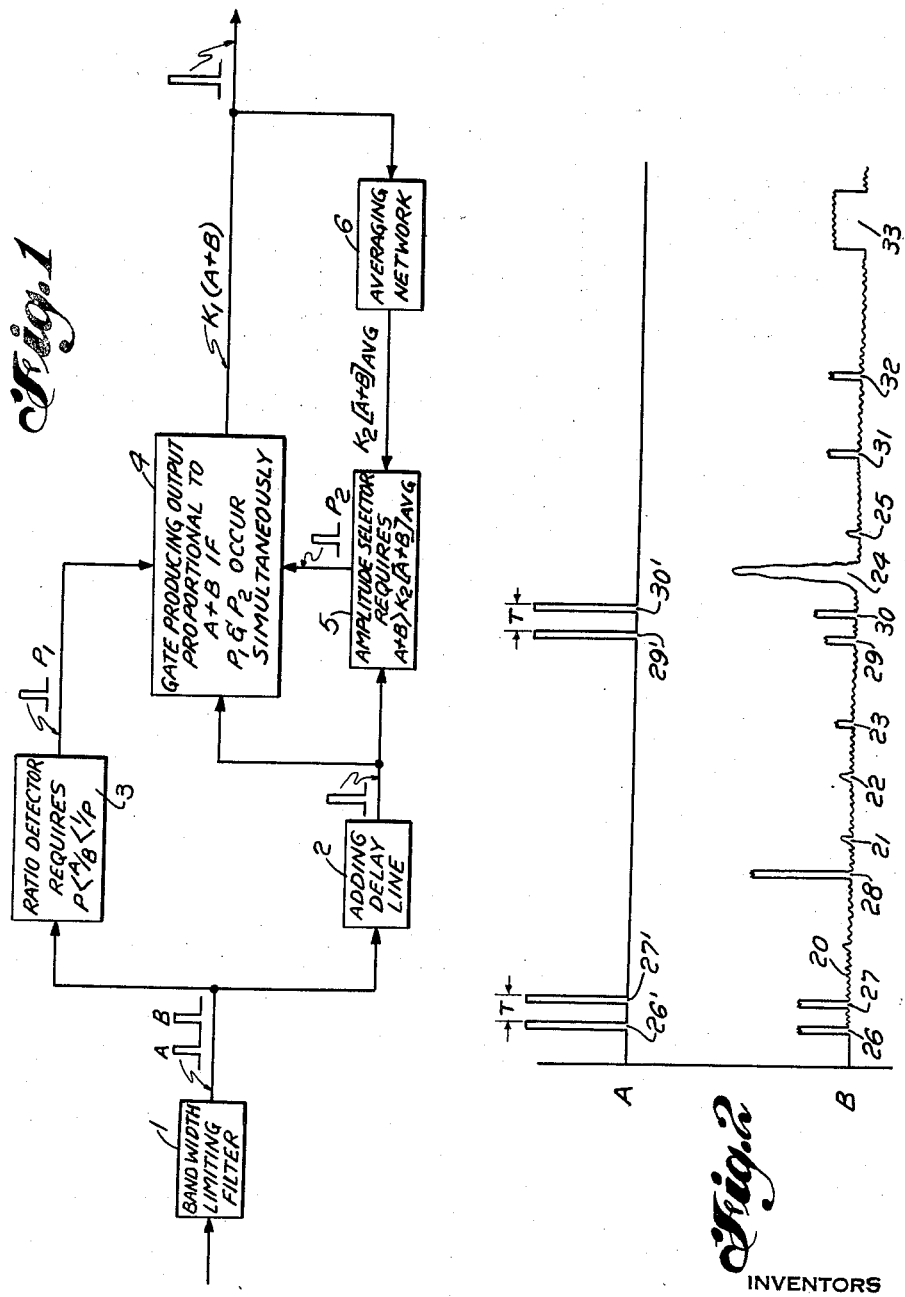

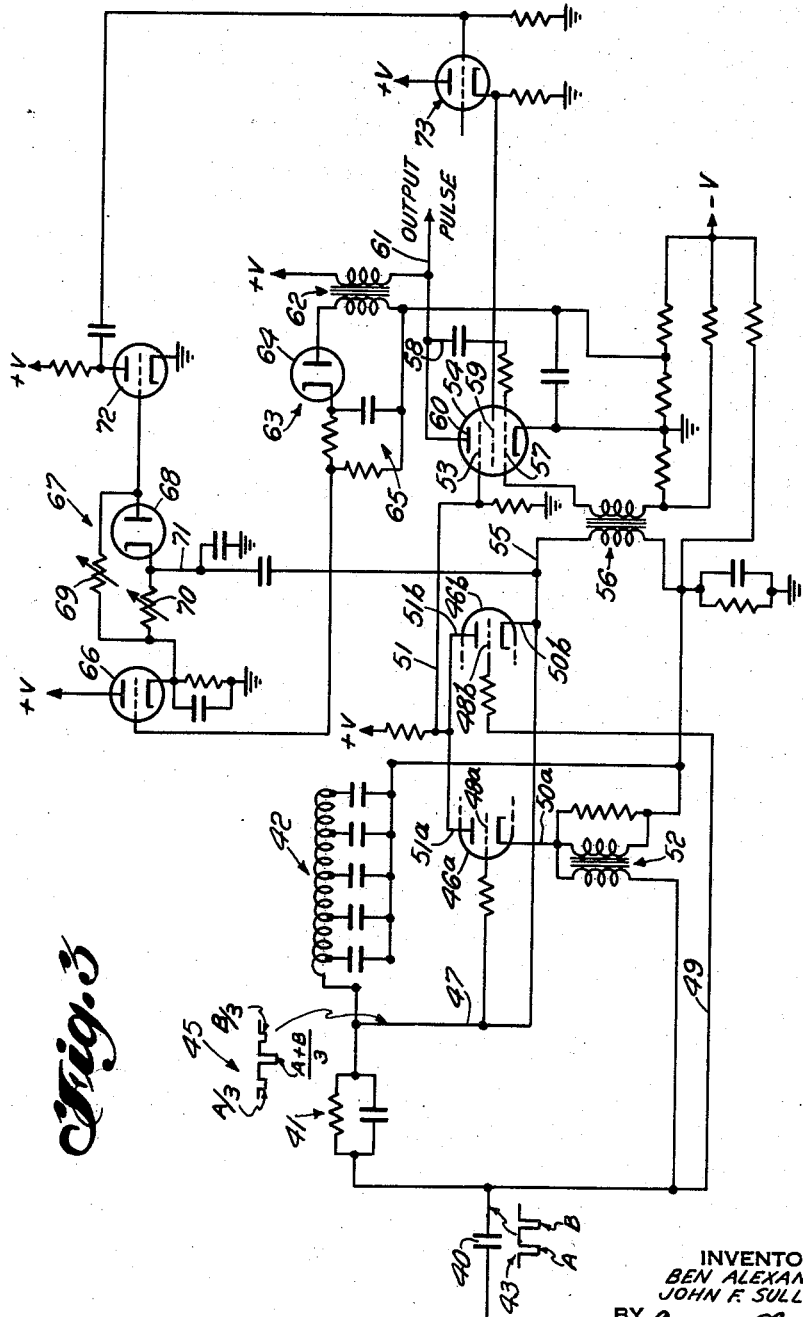

2,861,184
PULSE PAIR DETECTOR

Ben Alexander, Nutley, and John F. Sullivan, Bloomfield, N. J., assignors to International Telephone and Telegraph Corporation, Nutley, N. J., a corporation of Maryland Application April 4, 1955, Serial No. 498,834

8 Claims. (Cl. 250—27)

This invention relates to a detector operative to produce output signals in response to the reception of a pulse pair signal having a given time spacing between pulses thereof.

In a system which propagates time modulated pulse trains of radio frequency energy it is desired that the pulse receiver respond to pulse pairs having a predetermined characteristic such as nominal time spacing. In many situations the amplitude characteristics of the received pulse pairs will vary between great limits, but it is only necessary that the receiver recognize a pulse pair as a signal, regardless of its amplitude, and decode the modulation such as time spacing between pulse pairs as it varies from a predetermined time characteristic. The receiver must have as much noise rejection as is practical and yet must be able to distinguish between when a pulse pair signal is received and when a single pulse is received along with noise at the given time interval instead of the second pulse of the signal pair. In addition, the pulse pair detector must also distinguish between noise impulses received at the given time spacing instead of both a first and second pulse signal.

One of the objects of this invention is the provision of a detector for pulse pairs which is capable of recognizing as a signal in the presence of noise only a pulse pair having its pulses spaced by a given time interval and will discriminate against a combination of low level noise pulse pairs and the combination of a single pulse and low level noise.

One of the features of this invention is the provision of a pulse pair detector circuit which establishes the requirements that for a signal to be recognized in the presence of noise a detected pulse pair must be spaced by a given time interval and the ratio of the amplitude of any two succeeding pulses thereof must fall within certain limits to preclude the possibility of a single pulse of exceptionally large amplitude being detected as part of a pulse pair. The sum of the pulse pair amplitudes must exceed a level proportional to the sum of the amplitudes of previously accepted pulse pairs when averaged over a suitable period of time to preclude the possibility of a noise pair of low amplitude being detected as a signal.

The above-mentioned and other features and objects of this invention will become more apparent by reference to the following description taken in conjunction with the accompanying drawings, in which:

Fig. 1 is a schematic diagram in block form of one embodiment of the pulse pair detector in accordance with the principles of our invention;

Fig. 2 is a graphic illustration of a set of curves helpful in the explanation of this invention; and, Fig. 3 is a schematic circuit diagram of the detector.

Referring to Fig. 1, the input or detected pulse pair signal and the detected noise which is ever present is coupled through a suitable bandwidth limiting filter 1, the output of which is coupled to an adding delay line 2 and a ratio retector 3. If the detected pulse pair output of filter 1 is properly spaced by a given time interval of the pulse code the output of adding delay line 2 will be a signal whose amplitude is proportional to the sum of the individual pulse amplitudes of the pulses in the pulse pair. The output of the delay line 2 is coupled to the input of gating circuit 4 and to the amplitude selector circuit 5. The ratio detector circuit 3 generates a pulse output when the ratio of the amplitude of the first pulse A compared to the amplitude of the second pulse B falls within certain limits. The output of ratio detector 3 is used as a trigger pulse $P_1$ for gate circuit 4. When the output of delay line 2, coupled to amplitude selector 5, has a sum in excess of a level set as hereinafter explained, a second trigger signal $P_2$ is coupled to gate circuit 4. When both the first and second trigger signals $P_1$ and $P_2$ occur simultaneously in gate circuit 4, an output signal is produced which is proportional to the sum of the amplitudes of the pulses in the input pulse pair signal or in other words proportional to the output of adding delay line 2

$$[K_1(A+B)]$$

The output signal proportional to the sum of the amplitudes of the pulses in the input pulse pair is coupled to an averaging network 6 where the output signals are averaged over a suitable period of time and a signal proportional to the magnitude of the output of gate circuit 4 is coupled from the averaging network 6 to the amplitude selector 5. The signal coupled from averaging network 6 determines the level which the other input signals to selector circuit 5 from delay line 2 must exceed if a trigger pulse $P_2$ is to be coupled to the output gating circuit 4.

Fig. 2, curve A, represents a pulse pair coded signal sent by a transmitter, comprising a first pulse pair 26' and 27' and a second pulse pair 29' and 30'. The pulses in each pair separated by a time T. Curve B is a graphic illustration of the energy detected by a receiver of a system using pulse pair signals for communication. The low amplitude waveform 20 represents background noise which is always present. At random time intervals such as 21, 22, 23, and 25, bursts of low level noise pulses occur. In addition to the low level noise pulses, communication pulses occur which were transmitted by the transmitting station of the system illustrated in curve A, Fig. 2, and these pulses are represented by 26, 27, 29, 30. Other transmitters may also be operating and these signals can be represented by pulses 24, 31, 32 and 33. Since the communication system that we are interested in is designed to receive pulse pair signals which are nominally spaced apart by a given time interval T, it is desired that the receiver detect only pulse pair 26, 27 and pulse pair 29, 30 while rejecting all other pulse pairs. The pulse detector of this invention has an improved noise rejection characteristic, and enables the receiver to recognize as a signal in the presence of noise only the pulse pair which is spaced by a given time interval while discriminating against the combination of low level noise pulse pairs and a single pulse combined with low level noise. The block diagram of Fig. 1 illustrates the conditions which must be met before an output pulse can be generated by circuit 4.

The first of these is that the pulse pairs must have a spacing of T between the pulses. The functioning of the delay line 2 requires that the pulses be spaced apart by a given time interval. Thus pulses 21 and 22 would not be detected as a pair since they are not spaced apart a given interval nor would pulse pair 31 and 32 be detected as a communication pulse pair since they exceed the given time interval.

The second requirement is that the sum of the amplitudes of the first and second pulses in a pulse pair be greater than a predetermined factor of the average sum of the amplitudes averaged over a given period of time. This requirement that the amplitude of the sum exceed a proportion of the average amplitude eliminates from consideration as a pulse pair signal pulses 22 and 23 since these low level noise pulses do not exceed the average amplitude of the preceding pairs.

The third requirement is that the ratio of the amplitudes of the pulses in each pair be within certain limits. The ratio detector 3 of Fig. 1 requires that the ratio of the amplitude to the first and second pair be greater than a given constant and less than the inverse of that constant. Thus, pulse pair 28, 21 will not have its ratio of amplitudes fall within this limit nor would pulse pair 24, 25 be considered as falling within the desired ratio. The desired communication pulse pairs 26, 27 and 29, 30 meet the requirements of proper given time spacing, proper ratio of amplitudes and sum of the amplitudes exceeding the average sum pairs and thus an output pulse is generated from gate circuit 4 responsive to the pulse pairs 26, 27 and 29, 30 and the receiver is inoperative to all other detected energy.

Referring to Fig. 3 of the drawing, a schematic circuit diagram of one embodiment of our invention is shown therein which is helpful in the explanation of the operation of the pulse pair detector. It is of course understood that the picked signal detected by the front end of the receiver (not shown) may be differentiated so as to preclude a long pulse such as 33 of Fig. 2 being decoded as a desired pulse pair since its amplitude level will exceed the preset amplitude level at the given time spacing. The positive peak output of the differentiation step may be clipped off using a short time constant so that it will not interfere with the following signals. It may then be filtered to eliminate frequencies in excess of those expected in the desired pulse, and its voltage is linearly amplified to as high a level as is obtainable with a practical B voltage supply. For purposes of simplicity and illustration the above well-known steps are not shown in the simplified circuit diagram of Fig. 3.

The input to the circuit diagram of Fig. 3 comprises the amplified signal detected by the receiver fed through coupling condenser 40 to a network 41 which attenuates the pulse to ⅓ of its value at the input terminals of the open circuited line 42. Delay line 42 has a time delay equal to ½ the expected pulse spacing. Thus, as shown in Fig. 3 the input pulse pair 43 has its amplitude lowered to ⅓ of its original value and is coupled to the open circuited delay line 42 whose output will consist of a triad pulse signal 45 whose center pulse amplitude is equal to one third the sum of the amplitudes of the input pulse pair 43. A dual triode 46 shown as electron discharge devices 46a and 46b is utilized as the ratio detector 3 of Fig. 1 to determine that the ratio of the voltages of the first pulse A and the voltage of the second pulse B is within the prescribed limits. The center pulse of the triad signal coupled over line 47 to the grid 48a of triode 46a has a value which is equal to the sum of the amplitudes of the input pulse pair divided by three due to the action of the resistor network 41 in attenuating the amplitude of the input pulses 43 to ⅓ of their original value. The ⅓ value is achieved due to the attenuation in the input to the delay line 42 whose output would be ½ the sum of the input pulse amplitudes if it was driven from its own characteristic impedance. The voltage on the grid 48a is then $$\frac{A+B}{3}$$

Simultaneously with the coupling of the $$\frac{A+B}{3}$$

voltage, representing the central pulse of the triad output output of the delay line 42, a pulse is coupled over line 49 to the grid 48b of triode 46b. It is obvious that although both the first and second pulses A and B of the pulse pair 43 will be coupled to grid 48b only the second pulse B will occur simultaneously with the central pulse of the signal coupled over line 47 to the grid 48a of triode 46a. In order for the input pulses to cause an output in dual triode 46 the voltage applied to each grid must exceed the cathode bias. The cathode bias coupled to cathode 50a of tube 46a is equal to one half (B/2) the signal coupled to grid 48b of tube 46b due to the winding ratio of transformer 52, and the signal coupled to the cathode 50b is the triad pulse output of delay line 42. In order that their common plate 51 may rise, both tubes 46a and 46b must be cut off which requires that the grid voltage exceed the cathode bias. In other words, considering tube 46a the grid bias of $$\frac{A+B}{3}$$

applied thereto must be greater than B/2 the bias applied to cathode 50a before it will be cut off. Considering triode 46b, it is clear that the grid bias at the same instant of time is equal to B, whereas the cathode bias is equal to $$\frac{A+B}{3}$$

and thus in order for tube 46b to be cut off $$\frac{A+B}{3}$$

must be less than B. It thus is clear that the two simultaneous conditions set up by the dual triode 46 requires that $$B > \frac{A+B}{3} > \frac{B}{2}$$

and therefore that A/B be within the limits of ½ and 2 and thus the operation of the ratio detector illustrated by block 3 in Fig. 1 is shown.

When the conditions of the ratio detector are met as heretofore explained, the rise in the common plate 51a and 51b is applied over line 51 to the suppressor grid 53 of gating tube 54 to partially prepare the tube 54 for conduction. Simultaneously, with the application of the pulse from the common plate 51a and 51b of the ratio detector to the suppressor grid of tube 54, a pulse having an amplitude proportional to the sum of the input pulse amplitudes $A+B$ is connected from the output of the delay line 42, over line 55 and through transformer 56 to grid 57 of the gating tube 54 so that the signal applied to the grid 57 will be proportional to the sum of the amplitudes of the input pulses. The gating tube 54 is provided with enough negative plate to grid feedback over line 58 so that the plate pulse output is proportional to the sum of the amplitudes of the input pulses or in other words the pulse output of tube 54 equals $K_1(A+B)$ where $K_1$ is a proportionality factor. In order to discriminate against noise pulse pairs of low amplitude the plate pulse output of gating tube 54 is completely cut off due to a lack of voltage on screen grid 59 unless the sum of the amplitude of the first and second pulses $A+B$ exceeds a level determined by the amplitude selector as hereinafter explained.

Assuming the conditions for gating tube 54 are met, a pulse proportional to the sum of the amplitudes of the input pulses is coupled from plate 60 to the output terminal 61. This output pulse is also coupled through transformer 62 to network 63. Diode 64 functions as a peak detector, the output of which is stretched and averaged. The time constant network 65 portion of the network 63 determines the interval of time over which the pulse pair amplitude level is averaged. This average level is coupled through tube 66 functioning as a cathode follower to the amplitude selector circuit 67 comprising diode 68 and resistors 69 and 70. The average value of the previous signals is coupled to the cathode of the diode 68 from the peak detector circuit 64 in the network 63 and this average value of the previous signals is also coupled over resistance 69 to the plate of diode 68. Simultaneously, the output of the delay line proportional to the sum of the amplitudes of the input pulse pair is coupled to the cathode of the diode 68 via line 71. Before diode 68 can conduct the input over line 71 representing a signal proportional to the sum of the amplitudes of the input pulse pair must exceed the average level of the previous signal. When diode 68 conducts, its output is amplified in tube 72 and fed through the cathode follower arrangement of tube 73 back to the screen grid 59 of the gating tube 60. The bridge network contained in amplitude selector circuit 67 can have its proportion varied in order to vary the preset amplitude level that the pulse pair must exceed prior to its opening the gated tube 54.

The pulse output of gating tube 54 coupled from plate 60 to terminal 61 can be utilized to trigger other circuits.

While we have described above the principles of our invention in connection with specific apparatus, it is to be clearly understood that this description is made only by way of example and not as a limitation to the scope of our invention as set forth in the objects thereof and in the accompanying claims.

We claim:

1. A ratio detector for producing a signal output when the ratio of the amplitudes of a first and second pulse of a pulse pair are between an upper and lower limit comprising a pair of electron discharge devices having a common plate circuit and each having a grid and cathode, means to produce a first bias voltage proportional to the sum of the amplitudes of said first and second pulse, means to couple said first biasing voltage to the grid of the first of said electron discharge devices and to the cathode of the second of said electron discharge devices, means to simultaneously couple a second biasing voltage proportional to one of said pulses of said pulse pair to the cathode of said first electron discharge device and means to simultaneously couple a third biasing voltage proportional to the one of said pulses of said pulse pair to the grid of the second of said electron discharge devices whereby a signal output is produced at said common plate circuit when said biasing voltage coupled to the grids of said electron discharge devices exceeds the biasing voltages coupled to the cathodes of said devices.

2. A detector for pulse pair signals having a given time spacing between the pulses thereof, comprising a source of pulse signals, means coupled to said source to produce a first signal when the ratio of the amplitudes of any two succeeding pulses is within predetermined limits, means coupled to said source to produce a second signal corresponding to the addition of the amplitudes of any two succeeding pulses having said given time spacing, means, including an output circuit, for producing pulse energy upon coincidence of said first and second signals and means to apply said first and second signals to said output circuit.

3. A detector for pulse pair signals having a given time spacing between pulses thereof, comprising a source of pulse signals, means coupled to said source to produce a first pulse when the ratio of the amplitudes of any two succeeding pulses is within predetermined limits, means coupled to said source to produce a second pulse corresponding to the addition of the amplitudes of any two succeeding pulses having said given time spacing, means to establish an amplitude level related to the amplitude level of said pulse pair signals, means, coupled to said second pulse producing means, for producing a third pulse when said second pulse exceeds said amplitude level, means, including an output circuit, for producing pulse energy upon coincidence of said first and third pulses, means to apply said first and third pulses to said output circuit and means to couple said output circuit to said means to establish an amplitude level.

4. A detector for pulse pair signals having a given time spacing between pulses thereof, comprising a source of pulse signals, means coupled to said source to produce a first pulse when the ratio of the amplitudes of any two succeeding pulses is within predetermined limits, means coupled to said source to produce a second pulse corresponding to the addition of the amplitudes of any two succeeding pulses having said given time spacing, means to obtain the average amplitude of said second pulses over a predetermined period of time, means, coupled to said second pulse producing means, for producing a third pulse when said second pulse exceeds said average amplitude, means, including an output circuit, for producing pulse energy upon coincidence of said first and third pulses, means to apply said first and third pulses to said output circuit and means to couple said output circuit to said means to obtain the average amplitude.

5. A detector for pulse pair signals having a given time spacing between pulses thereof, comprising a source of pulse signals, means coupled to said source to produce a first pulse when the ratio of the amplitudes of any two succeeding pulses is within predetermined limits, delay means coupled to said source having a delay time equal to one half said given time spacing, means to couple from said delay means a second pulse proportional to the sum of the amplitudes of any two succeeding pulses having said given time spacing, means to obtain the average amplitude of said second pulses over a predetermined period of time, means coupled to said delay means for producing a third pulse when said second pulse exceeds said average amplitude, means, including an output circuit, for producing pulse energy upon coincidence of said first and third pulses, means to apply said first and third pulses to said output circuit and means to couple said output circuit to said means to obtain the average amplitude.

6. A detector for pulse pair signals having a given time spacing between pulses thereof, comprising a source of pulse signals, a ratio detector coupled to said source for producing a first pulse when the ratio of the amplitudes of a first and second pulse of a pulse pair is between an upper and lower limit, means coupled to said source to produce a second pulse corresponding to the addition of the amplitudes of any two succeeding pulses having said given time spacing, means to obtain the average amplitude of said second pulses over a predetermined period of time, means, coupled to said second pulse producing means, for producing a third pulse when said second pulse exceeds said average amplitude, means, including an output circuit, for producing pulse energy upon coincidence of said first and third pulses, means to apply said first and third pulses to said output circuit and means to couple said output circuit to said means to obtain the average amplitude.

7. A detector for pulse pair signals having a given time spacing between pulses thereof, comprising a source of pulse signals, a ratio detector coupled to said source for producing a first pulse when the ratio of the amplitudes of a first and second pulse of a pulse pair is between an upper and lower limit and including a pair of electron discharge devices having a common plate circuit and each having a grid and cathode, means coupled to said source to produce a first bias voltage proportional to the sum of the amplitudes of said first and second pulses, means to couple said first biasing voltage to the grid of the first of said electron discharge devices and to the cathode of the second of said electron discharge devices, means coupled to said source to simultaneously couple a second biasing voltage proportional to one of said pulses of said pulse pair to the cathode of said first electron discharge device, means coupled to said source to simultaneously couple a third biasing voltage proportional to the one of said pulses of said pulse pair to the grid of the second of said electron discharge devices whereby said first pulse output is produced at said common plate circuit when said biasing voltage coupled to the grids of said electron discharge devices exceeds the biasing voltages coupled to the cathodes of said devices, delay means coupled to said source having a delay time equal to one half said given time spacing, means to couple from said delay means a second pulse proportional to the sum of the amplitudes of any two succeeding pulses having said given time spacing, means to obtain the average amplitude of said second pulses over a predetermined period of time, means coupled to said delay means for producing a third pulse when said second pulse exceeds said average amplitude, means, including an output circuit, for producing pulse energy upon coincidence of said first and third pulses, means to apply said first and third pulses to said output circuit and means to couple said output circuit to said means to obtain said average amplitude.

8. A detector for pulse pair signals having a given time spacing between pulses thereof, comprising a source of pulse signals, means coupled to said source to produce a first pulse when the ratio of the amplitudes of any two succeeding pulses is within predetermined limits, delay means coupled to said source having a delay time equal to one half said given time spacing, means to couple from said delay means a second pulse proportional to the sum of the amplitudes of any two succeeding pulses having said given time spacing, means to obtain the average amplitude of said second pulses over a predetermined period of time, means coupled to said delay means for producing a third pulse when said second pulse exceeds said average amplitude, means, including an output circuit, for producing pulse energy proportional to an input pulse upon coincidence of said first and third pulses, means to apply said first and third pulses to said output circuit and means to couple said output circuit to said means to obtain said average amplitude.

References Cited in the file of this patent
UNITED STATES PATENTS

| | | |
|---|---|---|
| 2,266,401 | Reeves | Dec. 16, 1941 |
| 2,408,079 | Labin et al. | Sept. 24, 1946 |
| 2,434,937 | Labin et al. | Jan. 27, 1948 |
| 2,482,782 | Lenny et al. | Sept. 27, 1949 |
| 2,489,297 | Labin et al. | Nov. 29, 1949 |
| 2,579,473 | Chitterjea | Dec. 25, 1951 |
| 2,703,364 | Birnbaum | Mar. 1, 1955 |
| 2,760,064 | Bell | Aug. 21, 1956 |